United States Patent [19]

Yoshida et al.

[11] Patent Number: 5,250,930
[45] Date of Patent: Oct. 5, 1993

[54] SWITCHING APPARATUS FOR ELECTRONIC DEVICES

[75] Inventors: Tatsuo Yoshida, Kanagawa; Kazuhiko Otake, Tokyo, both of Japan

[73] Assignee: Sony Corporation, Tokyo, Japan

[21] Appl. No.: 756,457

[22] Filed: Sep. 9, 1991

[30] Foreign Application Priority Data

Sep. 12, 1990 [JP] Japan .................. 2-241408

[51] Int. Cl.$^5$ .............................. G09G 3/02
[52] U.S. Cl. ..................... 345/168; 345/161
[58] Field of Search .......... 340/709, 710, 711, 706, 340/723; 200/517, 520, 547, 548, 571; 364/410

[56] References Cited

U.S. PATENT DOCUMENTS

| | | |
|---|---|---|
| 4,416,182 | 11/1983 | Wise et al. |
| 4,570,039 | 2/1986 | Osawa ........................ 200/517 |
| 4,661,810 | 4/1987 | Himelstein et al. ............. 340/710 |
| 4,672,541 | 6/1987 | Bromley et al. ............... 364/410 |
| 4,686,522 | 8/1987 | Hernandez et al. ............. 340/723 |
| 4,803,474 | 2/1989 | Kulp ........................ 340/709 |
| 4,809,215 | 2/1989 | Nakamura et al. ............. 340/804 |
| 4,841,291 | 6/1989 | Swix et al. .................. 340/710 |
| 4,880,950 | 11/1989 | Carson et al. ................ 200/547 |
| 4,885,580 | 12/1989 | Noto et al. ................. 340/711 |
| 4,887,968 | 12/1989 | Wickstead .................... 340/709 |
| 4,974,183 | 11/1990 | Miller ....................... 340/711 |

OTHER PUBLICATIONS

Patent Abstracts of Japan, vol. 4, No. 6 (M-088), Jan. 18, 1980 & JP-A-54 144 238 (Toshiba Corp.), Nov. 10, 1979.
Patent Abstracts of Japan, vol. 6, No. 7 (P-113), May 6, 1982 & JP-A-57 010 830 (Sony Corp.) Jan. 20, 1982.

*Primary Examiner*—Ulysses Weldon
*Assistant Examiner*—Gin Goon
*Attorney, Agent, or Firm*—Philip M. Shaw, Jr

[57] ABSTRACT

A switching apparatus for an electron device, for controlling movement of an image on a display unit, including a plurality of pushbuttons being provided on upper surfaces with directional symbols which represent upward, downward, leftward, rightward directions and random or non-linear paths of travel in which the image displayed is allowed to move. When the pushbuttons are pressed, control signals are transmitted to a control circuit of the electronic device. The pushbuttons with the symbols indicating the four directions are arranged in a cross form, while the pushbuttons with the symbols indicating random and/or non-linear paths of travel are arranged between the pushbuttons forming the cross arms. Further, the pushbuttons with the directional symbols are arranged around a center pushbutton for stopping movement of the displayed image. The pushbuttons are made of a resilient material and assembled as a single unit.

9 Claims, 5 Drawing Sheets

SWITCHING APPARATUS FOR ELECTRONIC DEVICES

BACKGROUND OF THE INVENTION

Field of the Invention

This invention relates to a switching apparatus for electronic devices. Particularly the present invention relates to a switching apparatus for an electronic device such as an electronic animation toy which is connected to a TV set for forming a desired image on a CRT display of the TV set.

Description of the Background Art

Conventionally, there has been proposed a switching apparatus for electronic devices which includes pushbutton switches provided, on upper surfaces thereof, with arrow symbols indicating upward, downward, leftward and rightward directions. When the pushbutton switches having the arrow symbols are pressed, the image on the CRT display moves in the direction of the arrow mark indicated on the pushbutton switch.

However, in order to move the displayed image in random or non-linear directions, a conventional switching apparatus must further have a plurality of pushbutton switches for controlling movement of the image in such a manner. Therefore, conventional switching apparatus tend to have a defficiency in that its size is large because the additional pushbutton switches must be arranged thereon.

SUMMARY OF THE INVENTION

It is an object of the present invention to provide a switching apparatus for electronic devices which overcomes the above-mentioned disadvantages such that a plurality of pushbutton switches are compactly arranged in a limited area.

In order to accomplish this object, there is provided a switching apparatus for an electronic device, for controlling movement of an image on a display unit, which includes a plurality of pushbuttons being provided, on upper surfaces thereof, the pushbuttons including directional symbols. The symbols represent upward, downward, leftward, rightward and random directions in which the image displayed is allowed to move. When pushbuttons are pressed, control signals are transmitted to a control circuit of the electronic device. The electronic device is connected to a CRT display on which a graphic image is displayed on the basis of a character signal transferred from a memory of the electronic device and is moved in the direction indicated by the mark on the pressed pushbutton. In addition, the pushbuttons with symbols indicating upward, downward, leftward and rightward directions are arranged in a cross form, while the pushbuttons with symbols indicating random or non-linear directions are arranged therebetween. The pushbuttons with the directional marks are arranged around a center pushbutton for stopping movement of the displayed image. Further, the pushbuttons are made of a resilient material and assembled into a single unit.

DETAILED DESCRIPTION OF THE PREFERRED EMBODIMENT

The preferred embodiment of a switching apparatus for electronic devices according to the present invention will now be described with reference to the accompanying drawings.

Figure 1:
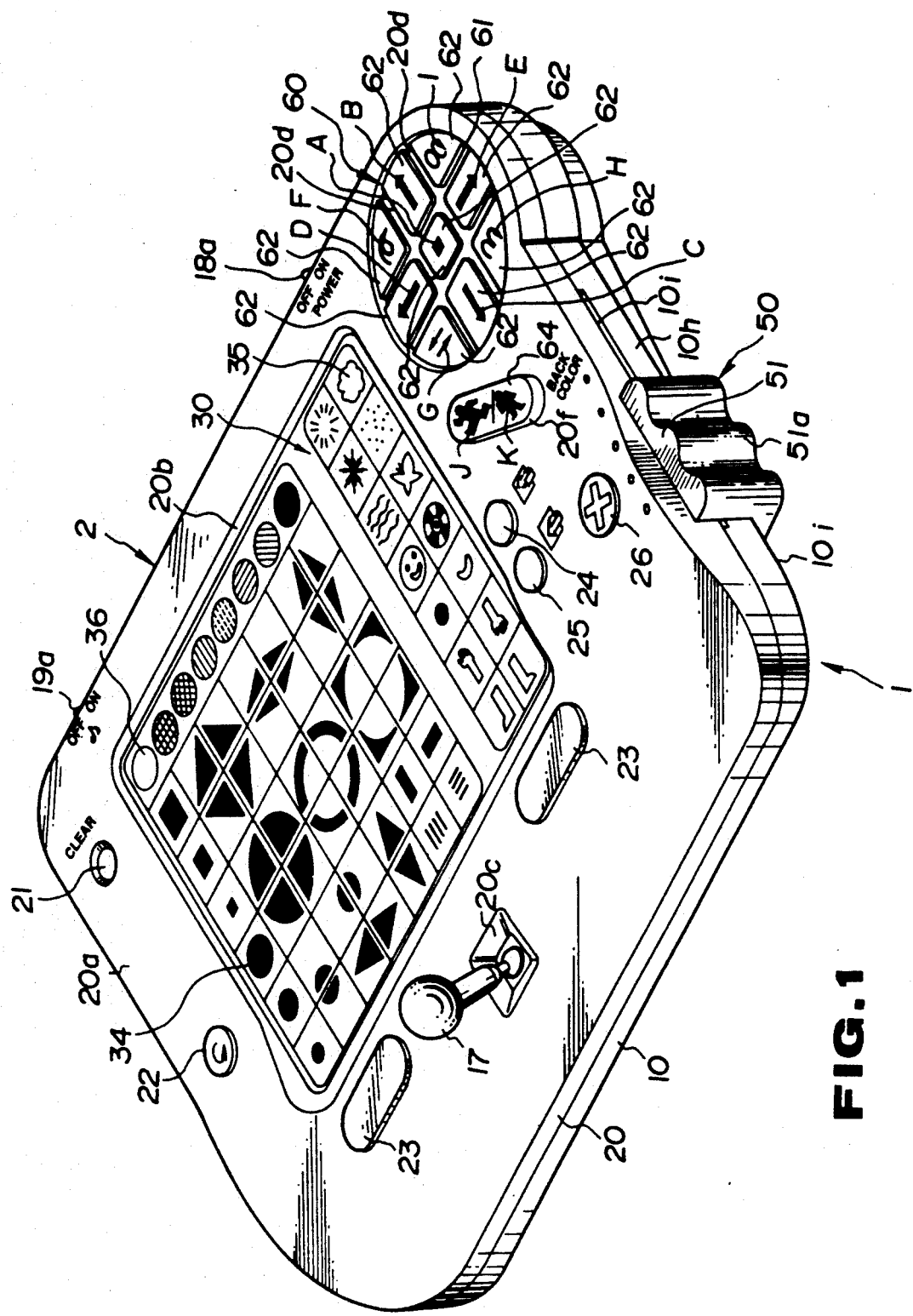
FIG. 1 is a perspective view of an electronic device having a switching apparatus according to one embodiment of the present invention.

Referring to FIG. 1, numeral 1 represents an electronic animation toy connectable to a TV set, whereby graphic images are displayed on a CRT display of the TV set. A housing body 2 of the electronic animation toy 1 includes upper and lower housings 20 and 10 made of synthetic resin. The upper and lower housings 20, 10 are secured together by tightening screws (not shown).

Figure 2:
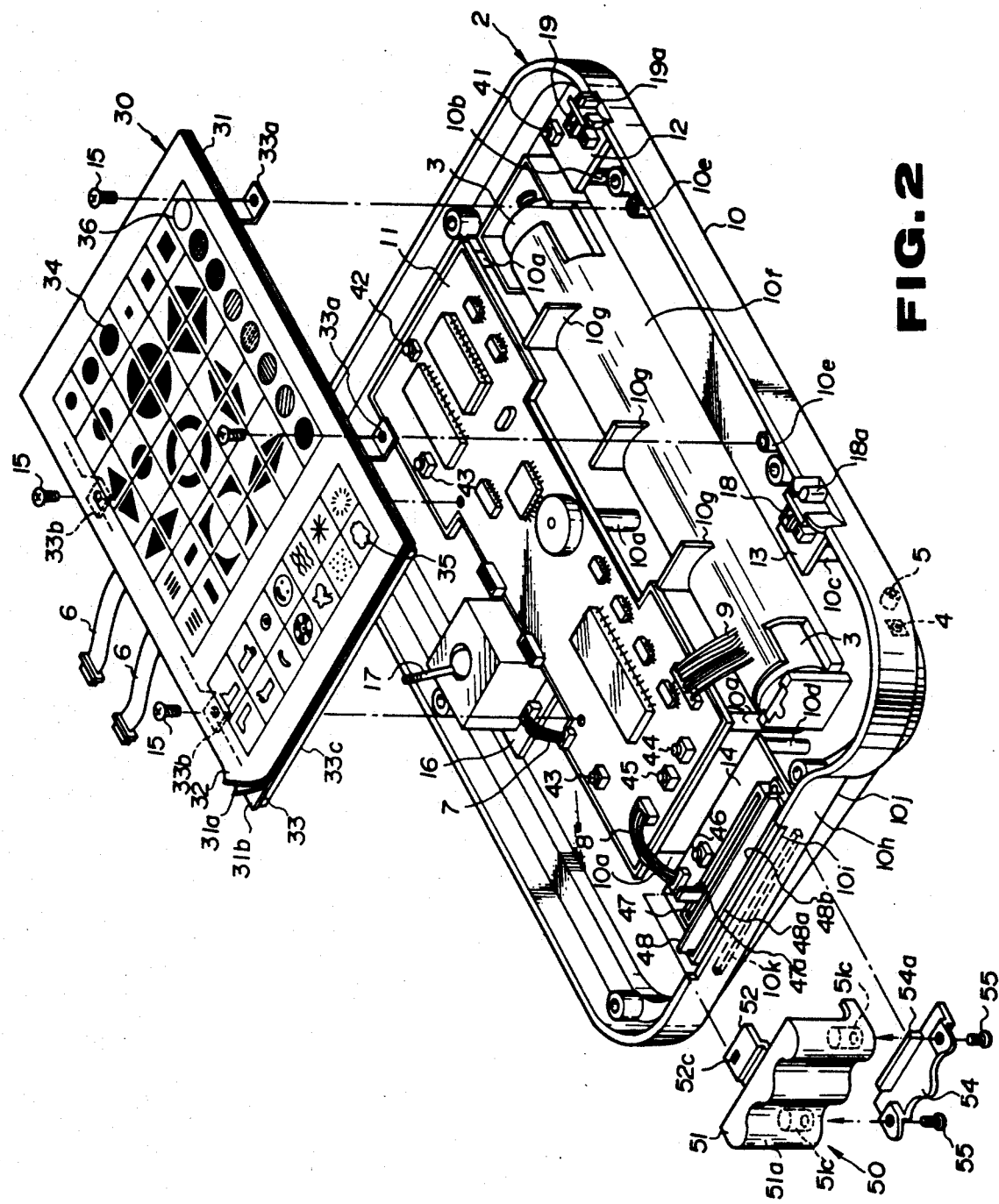
FIG. 2 is a perspective exploded view of the electronic device of FIG. 1.

As illustrated in FIG. 2, in which the rear side of the apparatus is in the foreground, the lower housing 10 has a plurality of cylindrical protrusions 10a formed uprightly in a middle area of an inner bottom surface thereof. Other cylindrical protrusions 10b, 10c are also disposed on left- and right-side rear portions of the inner bottom surface of the lower housing 10. A pair of cylindrical protrusions 10d are positioned on the right side of the middle portion of the inner bottom surface. The cylindrical protrusions 10a, 10b, 10c, 10d are formed integrally with the lower housing 10. On the cylindrical protrusions 10a is fixedly supported a substantially rectangular main substrate 11 which occupies the middle area of the lower housing 10. On the cylindrical protrusions 10b and 10c are fixedly supported respective switch substrates 12 and 13 of substantially square shape. On the cylindrical protrusions 10d is fixedly supported a slide switch substrate 14 of rectangular shape. The substrates 11, 12, 13 and 14 are secured on the cylindrical protrusions 10a, 10b, 10c, 10d by fastening means such as screws. A pair of cylindrical protrusions 10e, 10e are integrally formed on the left- and right-side rear portion of the inner bottom surface of the lower housing 10, extending uprightly therefrom along a rear side wall of the lower housing 10. On the main substrate 11 is fixedly supported a touch-sensitive panel 30 which functions as input device for transmitting signals for graphic images to the TV set. Further, a semi-cylindrical battery receptacle 10f is integrally formed on the inner bottom surface of the lower housing 10 extending parallel to the main substrate 11. The battery receptacle LOf is provided, on an outer surface thereof, with a rectangular opening to which a rectangular lid (not shown) may be openably mounted. The battery receptacle 10f receives a plurality of batteries 3, four batteries, for instance, therein. The battery receptacle 10f is also provided with three ribs 10g projecting inwardly therefrom and extending perpendicular to the longitudinal direction thereof. The ribs 10g are also formed integrally with the lower housing 10 so as to be disposed at given intervals apart from each other such that the touch-sensitive panel 30 is suitably supported thereon.

The touch-sensitive panel 30 is composed of a flat metal base plate 33, a flexible sheet switch 31 of an X-Y matrix switch type (not shown) and an upper transparent protective film 32. The sheet switch 31 has upper and lower sheets 31a and 31b laminated on each other such that the X-Y matrix switch is structured on the opposite contacting surfaces of the sheets 31a and 31b. The sheet switch 31 is placed on an upper surface of the metal base plate 33 and covered with the transparent protective film 32. The metal base plate 33 has two pairs of legs 33a, 33a and 33b, 33b along its front-side and rear-side peripheries, respectively. Each of the legs 33a, 33a and 33b, 33b includes an upright portion extending downward from the periphery of the base plate 33 and a horizontally bent portion extending outward from the lower end of the upright portion and having a threaded opening at its center. The metal base plate 33 is secured together with the overlaid sheet switch 31 and protective film 32 by screws 15 which are tightened through the openings of the legs 33a, 33b into the cylindrical protrusions 10e, 10e and the left- and right-side front portions of the main substrate 11.

The sheet switch 31 includes abstract graphic keys 34 having fourty-two kinds of abstract graphic segments such as ○, □, and △ as well as representational icon keys 35 having, for example, fourteen kinds of icons such as a cloud, wave, hand, foot and butterfly, which are printed respectively on the left- and right-side areas of a top surface of the sheet switch 31 coated with the transparent protective film 32. On a rear portion of the top surface of the sheet switch 31 which is adjacent to the graphic keys 34 are provided printed color keys 36 having, for example, 8 colors i.e. white, yellow, orange, red, purple, blue, green and black. When the keys 34, 35 and 36 are touched, the corresponding segment, icon and color thereof are indicated on the CRT display. When one of the graphic keys 34 is touched, a still image of the segment shown on the touched key is indicated on the CRT display, with a predetermined color. On the other hand, when one of the icon keys 35 is touched, an image of the icon on the touched key is indicated on the CRT display with an inherent movement and color determined according to its nature.

A joystick 17 extends upwardly from a base plate 16 placed on the front side of the main substrate 11. The joystick 17 is pivotably actuatable within a range of 360° whereby a position of the displayed image, or a portion thereof may be repositioned according to movement of the joystick.

A power switch 18, for turning a power supply on or off, is mounted on the switch substrate 13 fixed on the right-side rear portion of the lower housing 10. On the switch substrate 12 fixed on the left-side rear portion of the lower housing 10 are mounted a sound switch 19 for starting and stopping sound generation and a clear switch 41 for deleting all images indicated on the CRT display simultaneously.

An undo switch 42, a pair of execution switches 43, 43, frontward and rearward movement switches 45 and 44, are mounted on the left side, the left- and right-side front portion and the right side of the main substrate 11, respectively. When the undo switch 42 is pressed, an operation performed by turning on the execution switches 43, 43 is cancelled so that the state displayed immediately before the execution operation is restored to the CRT display. When each execution switch 43 is pressed, the image of the segment or icon moved by shifting the joystick 17 is fixed at a desired position on the CRT -display. The front-/rearward movement switches 45 and 44 are used for advancing the displayed image on the CRT display forward and receding the same rearward. Further, on the slide switch substrate 14 supported on the lower housing 10 are respectively mounted a deletion switch 46 and a slide switch 47 for selecting a background color of the CRT display. The deletion switch 46 functions to delete all images indicated in a certain region of the CRT display which is defined by moving a cursor. The slide switch 47 is actuated so that the color of the background is selected from several predetermined colors.

A guide block 48 made of synthetic resin is also secured on the slide switch substrate 14. The guide block 48 has a guide notch 48b extending in a longitudinal direction thereof. An upper surface 48a of the guide block 48 is flush with a guide notch 10i formed on the right side wall 10h of the lower housing 10. On an outside of a lower side wall 10j which extends inward from a lower end of the right side wall 10h, is formed a vertical guide notch 10k continuously extending along the wall 10h parallel to the guide notch 48b. Into the guide notches 10i and 10k is slidably engaged a slider 50 for actuating the slide switch 47.

Figure 5:
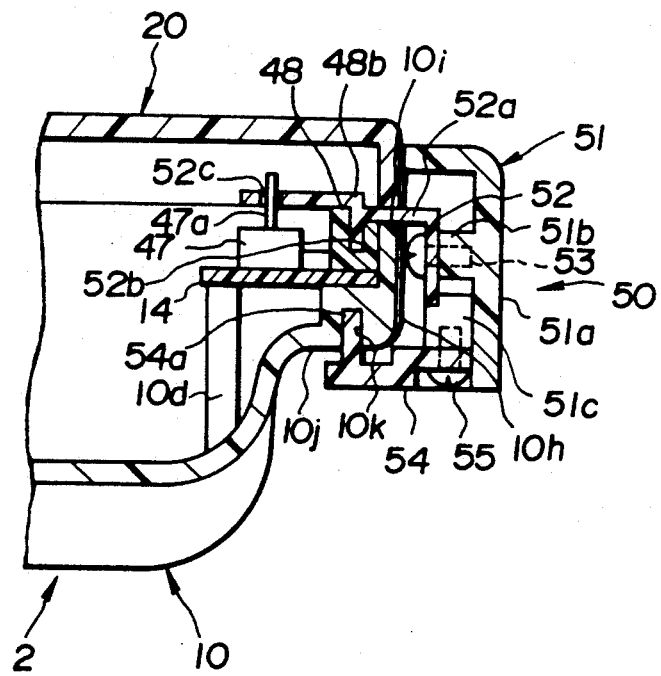
FIG. 5 is a sectional view of a slider of a slide switch used for the apparatus.

As illustrated in FIGS. 2 and 5, the slider 50 is composed of a slider housing 51 made of polystyrene resin and first and second guide plates 52 and 54 made of polyacetal resin which is a kind of oleo-resin of a self-lubricating type. The slider housing 51 has a corrugated outer surface 51a, a cylindrical protrusion 51b which horizontally projects from an inner surface of the slider housing 51 and has a threaded opening therethrough, and a pair of cylindrical protrusions 51c, 51c which vertically project from left and right sides of the inner bottom surface thereof and have threaded openings therethrough. The first guide plate 52 includes a flat portion 52a which extends in the horizontal direction and has an opening 52c at an end portion thereof, an upright portion 52b extending downward from a middle area of the flat portion 52a, and a vertically bent portion which extends downward from an end of the flat portion 52a and has an opening thereon. The first guide plate 52 is secured to the slider housing 51 by a screw 53 which is tightened through the respective openings of the vertically bent portion of the first guide plate 52 and the protrusion 51b. The flat portion 52a is fitted to the guide notch 10i of the right side wall 10h of the lower housing 10 while the upright portion 52b is engaged with the guide notch 48b of the guide block 48. The flat portion 52a and the upright portion 52b are slidably moved along the guide notches 10i and 48b, respectively. Through the opening 52c projects upward a lever 47a of the slide switch 47. Since an area of the opening 52c is larger than a cross-sectional area of the lever 47a, the lever 47a is loosely fitted to the opening 52c. The second guide plate 54 has an upright portion 54a projecting upward from an upper surface and longitudinally extending at an end thereof and a pair of openings which are formed on left and right sides thereof so as to be opposite the openings of the protrusions 51c, 51c of the slider housing 51. The upright portion 54a is fitted to the guide notch 10k of the underside 10j of the lower housing 10 so as to be slidably moved along the guide notch 10k. The second guide plate 54 is secured to the slider housing 51 by screws 55, 55 which are tightened through the openings of the protrusions 51c, 51c, respectively. Upon assembling, the slider 50 may be slidably moved to and for along the right side wall 10h of the lower housing 10. To this end, the lever 47a of the slide switch 47 is slidably moved according to the sliding movement of the slider 50 so that the slide switch 47 is actuated.

As illustrated in FIG. 1, the upper housing 20 is provided, on an upper surface 20a thereof, with a rectangular opening 20b and a square opening 20c which is spaced apart from the opening 20b. The opening 20b is smaller in size than the touch-sensitive panel 30 so that the touch-sensitive panel 30 projects from the opening 20b. From the opening 20c projects the lever of the joystick 17. On the upper surface 20a of the upper housing 20 there is also provided a plurality of pushbuttons including a clear pushbutton 21, an undo pushbutton 22, a pair of execution pushbuttons 23 and 23, front-/rearward movement pushbuttons 25 and 24 and a deletion pushbutton 26. These pushbuttons 21, 22, 23, 24, 25 and 26 are respectively opposed to the clear switch 41, the undo switch 42, the execution switches 43 and 43, the rear-/frontward switches 44 and 45 and the deletion switch 46. Thus, when either one of the pushbuttons 21 to 26 is pressed, the corresponding one of switches 41 to 46 is actuated.

Figure 3:
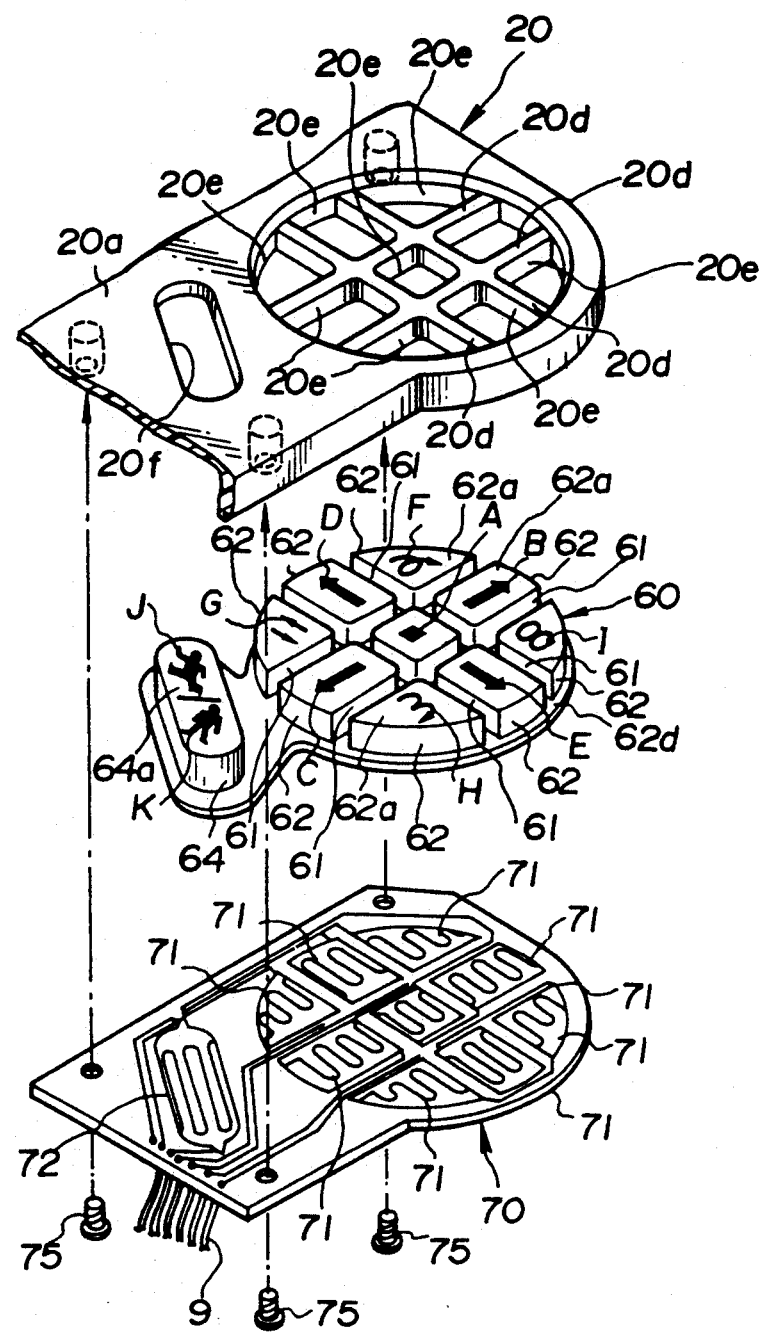
FIG. 3 is a perspective exploded view of the switching apparatus.
Figure 4:
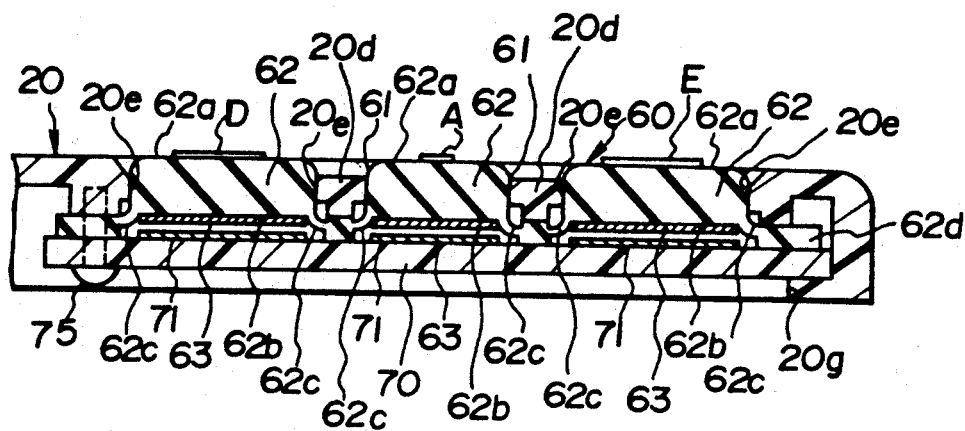
FIG. 4 is a sectional view of the switching apparatus.

Referring to FIG. 1, the upper and lower housings 20 and 10 have a round swelled portion at right-rear corners thereof. As illustrated in FIGS. 3 and 4, the round swelled portion of the upper housing 20 has a substantially circular opening in which a grating 20d is formed such that the circular opening is divided into nine small openings 20e arranged in three rows in longitudinal and transverse directions of the upper housing 20. The upper housing 20 is further provided with an elliptic opening 20f which is disposed on a slant relative to the longitudinal direction of the upper housing 20 and spaced apart from the circular opening. A plurality of protrusions 20g are formed integrally so as to extend inwardly from the lower periphery of the round swelled portion of the upper housing 20. Between the grating 20d and the protrusions 20g are inserted a switch substrate 70 on which wiring patterns 71 and 72 are formed. A pushbutton assembly 60 is overlaid on the substrate 70 such that a periphery 62d of the pushbutton assembly 60 is interposed between the substrate 70 and the upper housing 20. Further, the switch substrate 70 on which the pushbutton assembly 60 is placed is secured to the upper housing 20 by screws 75 which are tightened through openings formed on the switch substrate 70.

As illustrated in FIG. 3, the pushbutton assembly 60 is made of a resilient, rubberlike material and shaped approximately like a FIG. 8. The larger circular portion of the assembly 60 is fitted to the circular opening formed at the round swelled corner of the upper housing 20, while the smaller circular portion is fitted to the elliptic opening 20f. The larger circular portion of the pushbutton assembly 60 is divided into nine individual pushbuttons 62 by grooves 61 so that, when the assembly 60 is mounted between the substrate 70 and the upper housing 20, the grooves 61 are engaged with the grating 20d and individual pushbuttons 62 are allowed to project from the openings 20e. The nine pushbuttons 62 are separately used for directional movement control of each of the graphic segments and icons displayed on the CRT, as described in detail hereinafter. Each of the movement control pushbuttons 62 is provided, on its underside, with a recess 62b in which an electric contact 63 is formed by print wiring, bonding, or the like. When the pushbutton 62 is pressed, each electric contact 63 in the recess 62b is brought into contact with the corresponding pattern 71 of the switch substrate 70 so that an electrical connection is produced therebetween. In addition, the pushbutton assembly 60 has a protrudent portion used as a movement control pushbutton 64, which is fitted to the elliptic opening 20f and projects therefrom. The pushbutton 64 is also provided, on its underside, with a recess in which an electric contact (not shown) is formed by print wiring, or the like. When the pushbutton 64 is pressed, the electric contact held in the recess is caused to contact the pattern 72 of the switch substrate 70 to produce an electrical connection therebetween.

As illustrated in FIG. 3, each pushbutton 62 has an upper surface 62a on which a specific symbol is printed A symbol □, which is referred to as A and indicates a static state of the graphic segment or icon on the CRT display, is printed on the upper surface 62a of a square-shaped pushbutton positioned at the center of the control pushbuttons 62. The pushbuttons 62 disposed directly above, below and to the left and right sides of the centered pushbutton are provided with arrow symbols referred to as B, C, D and E in FIG. 3, which are printed on the upper surfaces 62a and indicate upward, downward, leftward and rightward directions, respectively. When a pushbutton 62 having such a symbol is pressed against biasing force exerted on a rib 62c of the pushbutton 62, the electric contact 63 in the recess 62b is electrically connected to the pattern 71 of the switch substrate 70. Thus, the graphic segment or icon or a defined region of composite segments or icons which are indicated on the CRT display is moved in appropriate direction in response to pressing of the pushbutton 62. In addition, the pushbuttons 62 other than ones having the symbols A to E are provided with path symbols referred to as F to I in FIG. 3, which are printed on the upper surfaces 62a. The path symbols F to I indicate non-linear paths of travel in which the displayed segment(s) or icon(s) may be moved. When the pushbutton 62 having the path symbol F is pressed against the biasing force exerted on the rib 62c, the electric contact 63 in the recess 62b is electrically connected to the pattern 71 of the switch substrate 70, the segment(s) or icon(s) move, for example, upward in a scrolling fashion on the CRT display. As another example, when the pushbutton 62 having the path symbol G is pressed, the segment(s) or icon(s) may move alternately left and right on the CRT display. When the pushbutton 62 having the path symbol H is pressed, the segment(s) or icons(s) scroll to the right on the CRT display. When the pushbutton 62 having the path symbol I is pressed, the segment(s) or icons(s) scroll in a shape on the CRT display. It will be understood that any type of predetermined motion of a display selection may alternatively be set for activation by the path symbol pushbuttons 62.

Further, man-shaped symbols indicating dynamic and static states, referred to as J and K in FIG. 3, are printed on an upper surface 64a of the pushbutton 64. When a portion J of the pushbutton 64, on which the symbol of a walking man is printed, is pressed, the segment(s) or icon(s) start the movement determined by pressing the respective pushbuttons 62. On the other hand, when a portion K of the pushbutton 64, on which the symbol of a standing man is printed, is pressed, the segment(s) or icon(s) stop moving.

Figure 6:
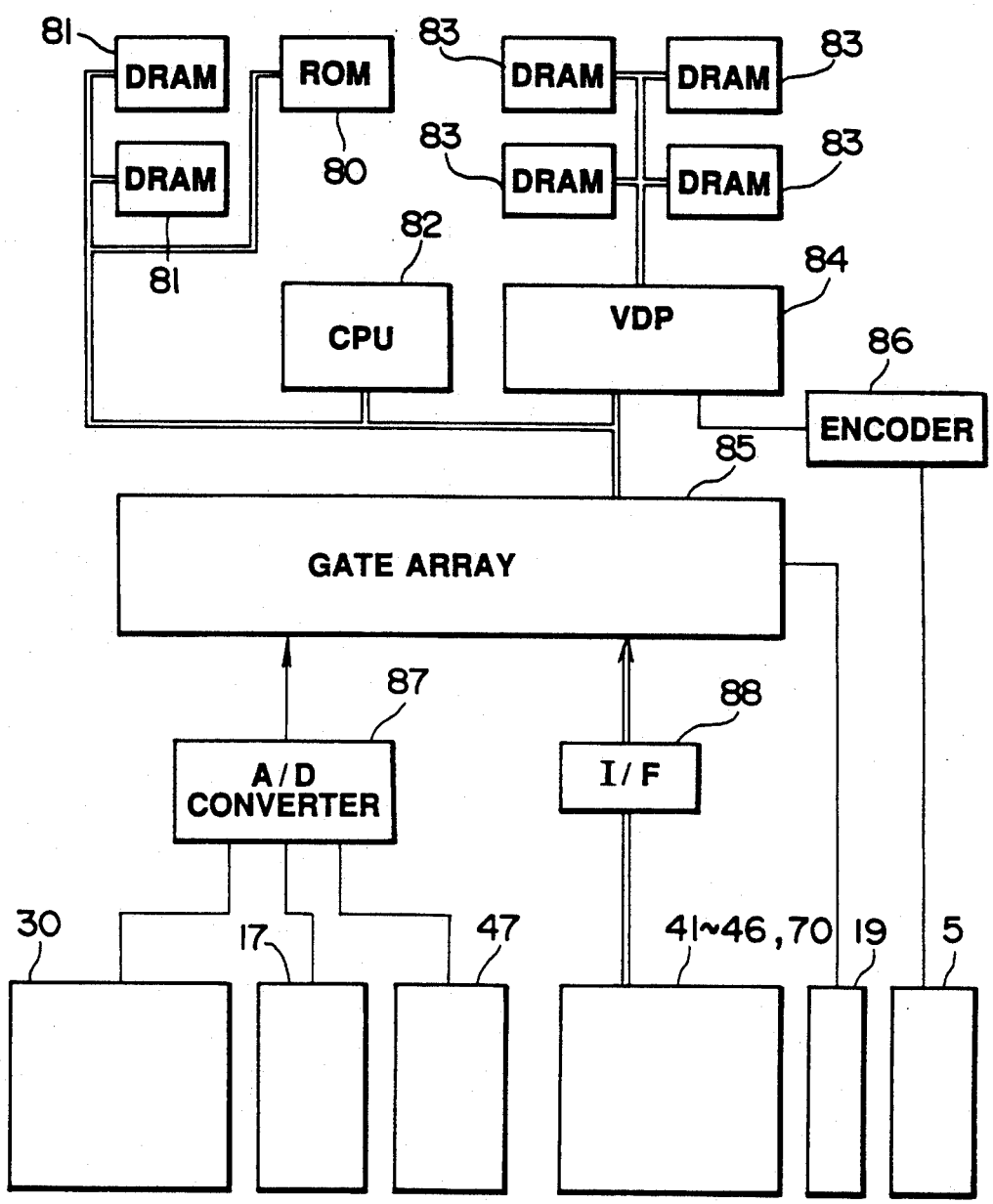
FIG. 6 is a block diagram of circuitry used for the electronic device

As illustrated in FIGS. 1 and 2, respective operating levers 18a and 19a of the power switch 18 and the sound switch 19 project from a rear wall of the lower housing 10. On the right side of the rear wall of the lower housing 10 are provided a connector 4 for connection to an AC adapter, and a video output terminal 5 for connection to a TV set. In addition, on the main substrate 11 secured in the lower housing 10 are mounted IC chips for ROM 80, DRAM 81 for data storage, CPU 82, DRAM 83 for display image storage, VDP (video display processor) 84, gate array 85, and the like as shown in FIG. 6. In FIG. 6, numeral references 86, 87 and 88 respresent an encoder, an A/D converter and an I/F amplifier, respectively. As illustrated in FIG. 2, the main substrate 11 is connected through flexible cables 6, 6 to the touch-sensitive panel 30. The main substrate 11 is also connected through wire harnesses 7, 8 and 9 to the joystick substrate 16, the slide switch substrate 14 and the switch substrate 70, respectively.

OPERATION

After turning on the power switch 18 of the electronic animation toy 1 when connected to the TV set, a selected key of the abstract graphic keys 34 on the touch-sensitive panel 30 is touched so that the graphic segment on the touched key is indicated at a certain position on the CRT display of the TV set. A color of the graphic segment is red at an initial state or one of eight colors of the color keys 36 which is determined by touching one of the color keys 36. The graphic segment moves on the CRT display according to control of the joystick 17. When the graphic segment moves to a desired position on the CRT display by controlling the joystick 17, the execution pushbutton 23 is pressed so that the segment is fixed in the desired position. When one of the icon keys 35 is touched, the icon on the selected key is indicated and fixed on the CRT display in the same manner as with the abstract graphic keys 34. A background color of the CRT display is selected from several predetermined colors by sliding the slider 50 to and fro along the right side wall 10h of the lower housing 10.

In the case that the front-/rearward movement pushbuttons 25 and 25 are pressed, the displayed graphic segment or icon perspectively advances (enlarges) forward or retreats rearward (is reduced) on the CRT display.

Further, when the pushbuttons 62 of the pushbutton assembly 60 are pressed, the displayed graphic segment or icon moves upward, downward, leftward or rightward as indicated by the arrows B to E of FIG. 1 or scrolls in random or non-linear directions as indicated with the path symbols F to I of the same.

Subsequently, when the man-shaped symbol J of the pushbutton 64 of the pushbutton assembly 60 is pressed, the displayed graphic segment or icon starts the directional movement selected by previously pressing one of the pushbuttons 62.

When the clear pushbutton 21 on the upper housing 20 is pressed, the displayed graphic segment or icon as a whole is deleted from the CRT display.

As is obvious from the aforementioned description of the preferred embodiment according to the present invention, the housing body 2 of the electronic animation toy 1 includes a lower housing 10 having a battery receptacle 10f which is provided with the ribs 10g projecting upward therefrom. Since the metal base plate 33 of the touch-sensitive panel 30 is supported on the ribs 10g, the touch-sensitive panel 30 is prevented from distortion and will properly function even if the touch-sensitive panel 30 is stepped on of struck by a child or other user. The ribs 10g also serve for reinforcement of the mechanical strength of the housing body 2.

The slider 50 of the slide switch 47 is slidably mounted on the right side of the housing body 2 and occupies a large area thereof so that handling of the slider 50 is considerably facilitated. Since the slider 50 includes the first and second guide plates 52 and 54 made of oleo-resin which are fitted into guide notches 10i and 10k of the lower housing 10, the slider 50 is prevented from damage due to distorting or twisting force. Moreover, as illustrated in FIG. 5, between the second guide plate 54 and the lower side wall 10j of the lower housing 10 there is provided sufficient space such that children can surely grasp the slider 50.

Further, the pushbutton assembly 60 overlaid on the switch substrate 70 is secured to the right-rear corner of the upper housing 20 by the screws 75 and the protrusions 20g formed on the lower end of the right-rear corner of the upper housing 20. To this end, the periphery 62d of the pushbutton assembly 60 is tightly attached to the substrate 70 while the grating 20d of the upper housing 20 is fitted to the grooves 61 of the pushbutton assembly 60, so that there is hardly any space therebetween. Therefore, foreign substances such as juice, food or the like cannot enter between the pushbutton assembly 60 and the substrate 70.

In addition, the pushbutton assembly 60 includes the movement control pushbuttons 62 which are provided, on the upper surfaces 62a thereof, with the arrow symbols indicating the separate directional movements of the graphic segment or icon on the CRT display, so that a variety of movements of the graphic segment or icon may be performed on the CRT display. The displayed graphic segment or icon is further animated by pressing the movement control pushbutton 64. The pushbutton assembly 60 having the pushbuttons 62 and 64 is arranged in a limited area of the upper housing 20. As a result, the area occupied by the movement control pushbuttons in the apparatus according to the invention is smaller than that in conventional apparatus. The size, weight and cost of the apparatus according to the invention is reduced as well as the design thereof is improved.

The apparatus according to the invention is further applicable to various kinds of electronic devices such as VTRs and the like. It will further be noted that, although the invention has been described in terms of selecting particular graphic shapes and the drawings show specific icons, any other shapes of icons may alternatively be used. Similarly, though the embodiment has been described with a specific number of symbol and background colors, more or fewer colors may also be embodied in the apparatus of the invention.

What is claimed is:

1. An electronic device for controlling movement of an image on a display unit, comprising:
   a stop pushbutton generating a stop signal when pressed and having a top side, a bottom side, a right side, and a left side;
   an upward pushbutton generating an upward signal when pressed and having a bottom side, a right side, and a left side, the bottom side of the upward pushbutton positioned adjacent to the top side of the stop pushbutton;
   a downward pushbutton generating a downward signal when pressed and having a top side, a right side, and a left side, the top side of the downward pushbutton positioned adjacent to the bottom side of the stop pushbutton;
   a rightward pushbutton generating a rightward signal when pressed and having a top side, a bottom side, and a left side, the left side of the rightward pushbutton positioned adjacent to the right side of the stop pushbutton;

a leftward pushbutton generating a leftward signal when pressed and having a top side, a bottom side, and a right side, the right side of the leftward pushbutton positioned adjacent to the left side of the stop pushbutton, the upward signal, the downward signal, the rightward signal, and the leftward signal forming a set of linear signals;

a first non-linear pushbutton generating a first non-linear signal and having a bottom side and a right side, the bottom side of the firs non-linear pushbutton positioned adjacent to the top side of the leftward pushbutton and the right side of the first non-linear pushbutton positioned adjacent to the left side of the upward pushbutton;

a second non-linear pushbutton generating a second non-linear signal and having a bottom side and a left side, the bottom side of the second non-linear pushbutton positioned adjacent to the top side of the rightward pushbutton and the left side of the non-linear pushbutton positioned adjacent to the right side of the upward pushbutton;

a third non-linear pushbutton generating a third non-linear signal and having a top side and a right side, the top side of the third non-linear pushbutton positioned adjacent to the bottom side of the leftward pushbutton and the right side of the third non-linear pushbutton positioned adjacent to the left side of the downward pushbutton;

a fourth non-linear pushbutton generating a fourth non-linear signal and having a top side and a left side, the top side of the fourth non-linear pushbutton positioned adjacent to the bottom side of the rightward pushbutton and the left side of the fourth non-linear pushbutton positioned adjacent to the right side of the downward pushbutton, the first non-liner signal, the second non-linear signal, the third non-linear signal, and the fourth non-linear signal forming a set of non-linear signals;

pushbutton assembly means for supporting the stop pushbutton, the upward pushbutton, the downward pushbutton, the rightward pushbutton, the leftward pushbutton, the first non-linear pushbutton, the second non-linear pushbutton, the third non-linear pushbutton, and the fourth non-linear pushbutton;

a substrate having a plurality of electrical contacts, each electrical contact corresponding to one pushbutton, wherein the electrical contact engages its corresponding pushbutton when the pushbutton is pressed; and control circuit means or receiving the stop signal and for halting a movement of the image as it moves across the display unit in response thereto, for receiving each of the linear signals and for moving the image linearly across the display unit in response thereto, and for receiving each of the non-linear signals and for moving the image non-linearly across the display unit in response thereto.

2. The electronic device according to claim 1 wherein the stop pushbutton, the upward pushbutton, the downward pushbutton, the rightward pushbutton, the leftward pushbutton, the first non-linear pushbutton, the second non-linear pushbutton, the third non-linear pushbutton, and the fourth non-linear pushbutton are comprised of a resilient material and are assembled into one unit.

3. The switching apparatus according to claim 1 wherein the upward pushbutton, the downward pushbutton, the rightward pushbutton, and he leftward pushbutton each have ea directional symbol on a surface.

4. The switching apparatus according to claim 1 wherein the first non-linear pushbutton, the second non-linear pushbutton, the third on-linear pushbutton, and the fourth non-linear pushbutton each have a directional symbol on a surface.

5. The switching apparatus according of claim 1 wherein the stop pushbutton has a stop symbol on a surface.

6. An electronic device for controlling movement of an image on a display unit, comprising:

an upper housing having a plurality of pushbutton openings separated by a grating and a panel opening;

a stop pushbutton generating a stop signal when pressed and having a top side, a bottom side, a right side, a left side, and a bottom surface, the stop pushbutton having an electrical contact on its bottom surface;

an upward pushbutton generating an upward signal when pressed and having a bottom side, a right side, a left side, and a bottom surface, the bottom side of the upward pushbutton positioned adjacent to the top side of the stop pushbutton, the upward pushbutton having an electrical contact on its bottom surface;

a downward pushbutton generating a downward signal when pressed and having a top side, a right side, a left side, and a bottom surface, the top side of the downward pushbutton positioned adjacent to the bottom side of the stop pushbutton, the downward pushbutton having an electrical contact on its bottom surface;

a rightward pushbutton generating a rightward signal when pressed and having a top side, a bottom side, a left side, and a bottom surfce, the left side of the rightward pushbutton positioned adjacent to the right side of the stop pushbutton, the rightward pushbutton having an electrical contact on its bottom surface;

a leftward pushbutton generating a leftward signal when pressed and having a top side, a bottom side, a right side, and a bottom surfce, the right side of the leftward pushbutton positioned adjacent to the left side of the stop pushbutton, the leftward pushbutton having an electrical contact on its bottom surfce, the upward signal, the downward signal, the rightward signal, and the leftward signal forming a set of linear signals;

a first non-linear pushbutton generating a first non-linear signal and having a bottom side, a right side, and a bottom surface, the bottom side of the first non-linear pushbutton positioned adjacent to the top side of the leftward pushbutton and the right side of the first one-linear pushbutton positioned adjacent to the left side of the upward pushbutton, the first non-linear pushbutton having an electrical contact on its bottom surfce;

a second non-linear pushbutton generating a second non-linear signal and having a bottom side, a left side, and a bottom surface, the bottom side of the second non-linear pushbutton positioned adjacent to the top side of the rightward pushbutton and the left side of the non-linear pushbutton positioned adjacent to the right side of the upward pushbutton, the second non-linear pushbutton having an electrical contact on its bottom surface;

a third non-linear pushbutton generating a third non-linear signal and having a top side, a right side, and a bottom surface, the top side of the third non-linear pushbutton positioned adjacent to the bottom side of the leftward pushbutton and the right side of the third non-linear pushbutton positioned adjacent to the left side of the downward pushbutton, the third non-linear pushbutton having an electrical contact on its bottom surface;

a fourth non-linear pushbutton generating a fourth non-linear signal and having a top side, a left side, and a bottom surface, the to side of the fourth non-linear pushbutton positioned adjacent to the bottom side of the rightward pushbutton and the left side of the fourth non-linear pushbutton positioned adjacent to the right side of the downward pushbutton, the fourth non-linear pushbutton having an electrical contact on its bottom surface, the first non-linear signal, the second non-linear signal, the third non-linear signal, and the fourth non-linear signal forming a set of non-linear signals;

pushbutton assembly means for supporting the stop pushbutton, the upward pushbutton, the downward pushbutton, the rightward pushbutton, the leftward pushbutton, the first non-liner pushbutton, the second non-linear pushbutton, the third non-linear pushbutton, and the fourth non-liner pushbutton, the pushbutton assembly means having a groove between each pushbutton, each groove being engaged with the grating formed in one of the plurality of pushbutton openings of the upper housing so that each pushbutton projects through the grating;

a substrate having a plurality of wiring patterns, each wiring pattern corresponding to one pushbutton, wherein each wiring pattern engages its corresponding pushbutton when the pushbutton is pressed; and control circuit means for receiving the stop signal and for halting a movement of the image as it moves across the display unit in response thereto, for receiving each of the linear signals and for moving the image linearly across the display unit in response thereto, and for receiving each of the non-linear signals and for moving the image non-linearly across the display unit in response thereto.

7. The electronic device of claim 6 further comprising:

a lower housing having a sidewall guide notch formed on a side wall of the lower housing, a bottom guide notch formed on the bottom of the lower housing, and having a battery receptacle formed integrally therewith, the lower housing secured to the upper housing by fastening means for fixably holding the upper housing and the lower housing together;

touch-sensitive panel means, mounted on the lower housing and positioned in the panel opening of the upper housing, for generating color signals, abstract graphic signals, and icon signals;

a slide switch substrate attached to the lower housing;

a slide switch having a longitudinal movement;

a slide switch guide block attached to the slide switch substrate, the slide switch guide block having a guide block guide notch which is parallel to a movement of the slide switch; and a slider having an upper guide plate and lower guide plate, the upper guide plate having a protrudent portion engaged in the guide block guide notch of the slide switch guide block and a flat portion extending through the sidewall guide notch, the lower guide plate having a protrudent portion which is engaged with the bottom guide notch.

8. The electronic device according to claim 6, wherein the control circuit means further comprises:

an analog-to-digital converter;

an intermediate frequency amplifier; and encoder;

a read only memory;

first dynamic random access memory means for data storage, second dynamic random access memory means for display image storage, a video display processor connected to the second dynamic random access memory means and the second; and a gate array connected to the analog-to-digital converter, the intermediate frequency amplifier, the first dynamic random access memory means, the read only memory, and the video display processor.

9. The electronic device according to claim 8 wherein the stop pushbutton, the upward pushbutton, the downward pushbutton, the rightward pushbutton, the leftward pushbutton, the first non-linear pushbutton, the second non-linear pushbutton, the third non-linear pushbutton, and the fourth non-linear pushbutton are comprised of a resilient material and are assembled into one unit.

* * * * *